United States Patent
Cartellieri et al.

(10) Patent No.: US 7,964,249 B2
(45) Date of Patent: Jun. 21, 2011

(54) METHOD FOR PRODUCING CROSSLINKED ACRYLATE HOT-MELT ADHESIVE COMPOUNDS

(75) Inventors: Ulf Cartellieri, Gross Krotzenburg (DE); Marc Husemann, Hamburg (DE); Christian Ring, Hamburg (DE); Stephan Zöllner, Hamburg (DE)

(73) Assignee: tesa SE, Hamburg (DE)

( * ) Notice: Subject to any disclaimer, the term of this patent is extended or adjusted under 35 U.S.C. 154(b) by 0 days.

(21) Appl. No.: 10/398,276

(22) PCT Filed: Oct. 5, 2001

(86) PCT No.: PCT/EP01/11503
§ 371 (c)(1),
(2), (4) Date: Feb. 2, 2011

(87) PCT Pub. No.: WO02/28963
PCT Pub. Date: Apr. 11, 2002

(65) Prior Publication Data
US 2004/0048944 A1    Mar. 11, 2004

(30) Foreign Application Priority Data
Oct. 6, 2000  (DE) .................................. 100 49 669

(51) Int. Cl.
*C08F 2/50* (2006.01)
*C09J 133/06* (2006.01)
*C08L 33/00* (2006.01)

(52) U.S. Cl. .. 427/516; 427/517; 428/345; 428/355 EN; 428/500; 522/34; 522/116; 522/130; 524/560; 525/131; 525/257; 525/293

(58) Field of Classification Search .................... 522/35, 522/34, 42, 182, 129, 36, 116, 121, 126, 522/74, 83; 427/516, 517; 428/345, 355 EN; 524/560; 525/257, 259, 131
See application file for complete search history.

(56) References Cited

U.S. PATENT DOCUMENTS

| | | | |
|---|---|---|---|
| 4,144,157 A | 3/1979 | Guse et al. | 203/159.23 |
| 4,234,662 A | 11/1980 | Pastor et al. | 428/500 |
| 4,672,079 A * | 6/1987 | Li Bassi et al. | 522/35 |
| 4,950,795 A * | 8/1990 | Husler et al. | 568/331 |
| 5,047,443 A | 9/1991 | Rehmer | 522/46 |
| 5,194,455 A | 3/1993 | Massow et al. | 522/152 |
| 5,264,533 A | 11/1993 | Rehmer et al. | 526/301 |
| 5,391,406 A | 2/1995 | Ramharack et al. | 427/516 |
| 5,416,127 A | 5/1995 | Chandran et al. | 522/149 |
| 5,741,543 A * | 4/1998 | Winslow et al. | 427/208.4 |
| 5,773,487 A | 6/1998 | Sokol | 522/42 |
| 6,224,949 B1 * | 5/2001 | Wright et al. | 427/508 |
| 6,448,301 B1 * | 9/2002 | Gaddam et al. | 522/6 |
| 6,489,384 B2 * | 12/2002 | Fink et al. | 524/153 |
| 7,268,173 B2 * | 9/2007 | Graichen et al. | 522/96 |

FOREIGN PATENT DOCUMENTS

| | | |
|---|---|---|
| DE | 24 43 414 A1 | 9/1974 |
| DE | 27 43 979 A1 | 9/1977 |
| EP | 0 343 467 B1 | 5/1989 |
| EP | 0 373 662 A2 | 12/1989 |
| EP | 0 578 151 B1 | 7/1993 |
| JP | 5 032952 | 2/1993 |
| WO | 93 09152 | 5/1993 |
| WO | 95 02 640 A1 | 1/1995 |
| WO | 96 35 725 | 11/1996 |
| WO | 98 01 479 A1 | 1/1998 |

OTHER PUBLICATIONS

English language Abstract of EP 0 578 151 B1.
Abstract JP 2000167999 A2.

* cited by examiner

*Primary Examiner* — Susan W Berman
(74) *Attorney, Agent, or Firm* — Norris McLaughlin & Marcus, PA

(57) ABSTRACT

Method for producing a polyacrylate adhesive compound by a hot-melt method in which a polyfunctional α-cleaving initiator, which is present as an oligomer, is added to the polymer to be crosslinked prior to the hot-melt method and ultraviolet crosslinking is carried out after treatment in the hot-melt method.

18 Claims, No Drawings

METHOD FOR PRODUCING CROSSLINKED ACRYLATE HOT-MELT ADHESIVE COMPOUNDS

Process for preparing crosslinked polyacrylate pressure-sensitive adhesives via a hotmelt process with subsequent crosslinking by means of ultraviolet radiation.

Polyacrylates—especially pressure-sensitive adhesives—crosslinkable by UV radiation have already been known for a long time. They offer a variety of advantages over the conventional, thermally crosslinkable systems. For instance, UV-crosslinkable acrylate polymers, applied two-dimensionally to a backing from solution, for example, can be crosslinked in the desired way by varying the activator concentration and the UV dose. Controlling the crosslinking density and hence the properties of the product is therefore easy to do, in addition to the dosing, by way of the operational parameters—in this case, the UV dose. Polymer systems which can be dynamically controlled in this way signify a substantial advantage in a modern production structure, when a complex product portfolio is to be realized starting from a few basic building blocks.

UV crosslinking can be achieved by different methods. In the simplest case, a UV activator is added to a customary, saturated polyacrylate. A distinction is made here between type I and II activators: the former cleave following UV activation, the latter abstract hydrogen atoms after UV activation.

It has been found that admixed type I photoinitiators are generally incapable of generating crosslinkable free radicals on a customary saturated polyacrylate. Other, competing reactions predominate. If a type II photoinitiator is added, in contrast, a crosslinking reaction can be achieved for a polyacrylate composition without further modification, in the case, for example, of a copolymer of 2-ethylhexyl acrylate and acrylic acid. This reaction, however, is not very efficient if resins are admixed in order to increase the bond strength. A particular reason for this is that the resins absorb UV light, have a strongly regulating influence, and so adversely affect or even prevent UV crosslinking. Even the addition of polyfunctional acrylates or methacrylates for increasing the crosslinking efficiency has little effect. Furthermore, unreacted acrylate groups may lead to a disruptive post-crosslinking, which is disadvantageous for the stability of the product properties.

A more elegant method lies in incorporating vinylic double bonds into the acrylate polymer from the outset in order to facilitate crosslinking.

U.S. Pat. No. 4,234,662 describes a process for preparing hotmelt adhesives having pressure-sensitive properties which consists of the following steps:

Copolymerization of allyl acrylates or methacrylates with at least one copolymerizable acrylate monomer to give a prepolymer which is solid at room temperature; heating of the resultant solid allylically unsaturated prepolymer to a temperature at which it is liquid and fluid, and coating of the liquid prepolymer onto a substrate. The coated substrate is subjected to electron beams of from 1 to 4 megarads capable of crosslinking the polymer to form a cured, pressure-sensitive adhesive. A disadvantage of this process is the difficulty of its implementation, since during the free-radically initiated polymerization and during coating from the melt the polymers tend to form gel.

U.S. Pat. No. 5,391,406 and U.S. Pat. No. 5,416,127 therefore propose targetedly incorporating the polymer-bonded vinyl groups by means of a polymer-analogous reaction with dimethyl-meta-isopropylenyl-benzyl isocyanate (m-TMI).

Polymers functionalized in this way can be coated from the melt without forming gel, since the ceiling temperature of the thermal polymerization of the isopropenyl group is below the coating temperature. If a photoinitiator is added to the polymer, the composition is UV-crosslinkable. Nevertheless, this method too has its practical disadvantages: on the one hand, the operation conducted, by way of the polymer-analogous reaction, is very laborious and therefore inconvenient; on the other hand, high molecular mass, double bond functionalized polymers such as are produced in this case are particularly susceptible to shearing at high temperatures and therefore result in severe unwanted gelling in the course of processing by the hotmelt process, where high shearing forces act on account of the extruder processing operation.

Copolymerizable photoinitiators also make crosslinking easier. For instance DE 24 43 414 A1 describes a process for producing products made self-adhesive using an adhesive based on crosslinked polyacrylic acid derivatives, in which the adhesive contains in copolymerized form from 0.01 to 5% of an acrylic or methacrylic acid (2-alkoxy-2-phenyl-2-benzoyl)ethyl ester photoinitiator and is crosslinked by brief irradiation with ultraviolet light.

The (meth)acrylic esters used therein as polymerizable photosensitizers however, are obtainable only by a multistage synthesis with a relatively poor yield and, furthermore, are not very efficient in UV crosslinking.

For the purposes of improvement, DE 27 43 979 A1 describes a process for producing products coated with a self-adhesive composition based on crosslinked polyacrylic acid derivatives by copolymerization of a photoinitiator into the adhesive and subsequent crosslinking on the backing material by means of short-term UV irradiation, wherein 0.01 to 5% by weight of benizoin acrylate or benzoin methacrylate photoinitiator are copolymerized into the self-adhesive composition.

The adhesives described in these patents are preferably prepared by polymerization in solution and then coated from the solution onto a backing. Only the dry film can then be subjected to UV irradiation. Generally, however, the copolymerized photoinitiators have a drawback: the preparation of a UV-crosslinking acrylate pressure-sensitive adhesive system is very limited by the fact that only a very few photoinitiators are available as copolymerizable compounds without great inconvenience and therefore in a way which is of interest economically.

EP 0 578 151 B1 describes the use of pressure-sensitive adhesives based on polyacrylate with copolymerized benzoin derivatives for the continuous industrial melt coating of medical products with subsequent crosslinking of the adhesive by UV irradiation. Here again, the abovementioned restrictions apply in relation to the availability of photoinitiators of economic interest.

BASF AG describes copolymerizable benzophenone derivatives which following UV irradiation are able to abstract hydrogen atoms (EP 0 343 467; U.S. Pat. No. 5,047,443; U.S. Pat. No. 5,264,533). Unlike the cleavable activators, these photoactivators do not form low molecular mass constituents which can evaporate from the cured coat of composition and adversely affect its properties. For instance, the UV irradiation of the systems, which are described in, inter alia, the patent DE 27 43 979 A1, is followed by the formation of benzaldehyde, which can be perceived as a disruptive odor.

All of the photoinitiators hitherto described and/or the UV-crosslinkable acrylate prepolymers prepared from them are subject to a marked restriction in terms of the wavelength range which possesses an initiating effect with the crosslinking reaction. On account of its absorption maximum, every photoinitiator incorporated into the system by copolymerization determines the wavelength range subsequently available for crosslinking.

This produces a limitation if this acrylate prepolymer is to be crosslinked by means of ultraviolet radiation in the form, for example, of a relatively thick coat, a resin-blended polymer composition or a pigmented composition. Thus the multiplicity of the conventional systems can be crosslinked sufficiently only up to a limited coat thickness (for example, the system from the abovementioned DE 27 43 979 A1 up to a coat thickness of 50 µm). For thicker coats, the polymer no longer possesses sufficient UV permeability in a wavelength range within which the photoinitiator is active. Pigmented coats, for example, those of polymer compositions colored white by titanium dioxide, can no longer be UV-crosslinked at all in a wavelength range of 250 nm (absorption maximum of the abovementioned benzoin acrylates).

U.S. Pat. No. 5,194,455 describes a process for preparing acrylate-based pressure-sensitive hotmelt adhesives by irradiation of a substrate for which at least one acrylic monomer containing N-tert-butylacrylamide (TBA) is copolymerized, it being possible for the reaction mixture for polymerization to further comprise one or more ethylenically unsaturated compounds which are not part of the group of the abovementioned acrylic monomers, the resultant solid polymer is heated and brought in a fluid or liquid state onto a substrate, it being possible for additives and auxiliaries to be present, and the coated substrate is irradiated with high-energy radiation.

WO 96135725 claims a crosslinked, pigmented, pressure-sensitive adhesive which comprises a copolymer which is coated onto a substrate and cured by UV radiation such that it possesses a shear resistance of at least 20 hours at 70° C., said copolymer comprising a pigment, a hydrogen-abstracting photoinitiator, and an acrylate-based copolymer prepared from a substantially acid-free monomer mixture whose composition is as follows:
(i) about 30 to 99.9% by weight of at least one alkyl acrylate, the alkyl group possessing 1 to 24 carbon atoms,
(ii) about 0.01 to 15% by weight of a monomer containing a tertiary amine group,
(iii) 0 to 25% by weight of at least one polar vinyl monomer, and
(iv) 0 to 30% by weight of a diester of an ethylenically unsaturated dicarboxylic acid,
based in each case on the total weight of the monomer.

The crosslinking of coats of these polyacrylates requires long wave UV activators, such as isopropylthioxanthone. A disadvantage of copolymerized dimethylaminoalkyl compounds is the restriction to comonomers free of carboxylic acid, as occur in all implementations in WO 96/35725. For example, the thermally initiated solution polymerization of acrylate monomers, acrylic acid, and olefinically unsaturated dimethylaminoalkyl compounds leads after a short reaction time to a sharp rise in viscosity and to gelling.

Polar acrylate polymers in particular, and especially those containing carboxylic acid, are particularly advantageous for high-performance adhesives. Internal strength, which is significantly influenced by interpolymeric hydrogen bonds, can be assisted most efficiently, in addition to the actual crosslinking, by means of copolymerized acrylic acid. In addition, the peel increase known for polyacrylate, by means of which an increase in the bond strength is achieved, is substantially improved in the presence of significant proportions of copolymerized acrylic acid.

For saturated systems in particular the customary initiators are unsuitable or are suitable only when the system to be crosslinked is activated by means of comonomers or of adjacent electron donor groups. As a result, there has to date been no description of a UV-crosslinking system which is capable of effecting efficient crosslinking of polyacrylates without functional comonomers.

A disadvantage of the photoinitiators which are generally employed, furthermore, is that for the multiplicity of these initiators they do not withstand the hotmelt process; in other words, that they lose their reactivity as crosslinking initiators on heating to temperatures which are customary in such processes.

Benzoin derivatives and benzil derivatives are not suitable for high reaction temperatures. Thus "Chemistry & technology of UV & EB Formulation For Coatings, Inks and Paints, Volume 5, PKT Oldering, 1994" mentions benzoin methyl ether and benzil dimethyl ketal as examples of type I photoinitiators which are frequently employed. Both these photoinitiators cannot be used, or can be used only with great restrictions, for the hotmelt process, since they are unstable over a prolonged period of time and undergo decomposition. This is particularly the case in systems containing acrylic acid, which generally form the basis in the case of polyacrylate pressure-sensitive adhesives.

Although benzophenone as a hydrogen-abstracting initiator (type II) has a higher thermal stability, it undergoes a high degree of sublimation under thermal load and under vacuum from the acrylate pressure-sensitive adhesive. Similarly behavior is shown by camphorquinone, which likewise has only a relatively low molecular weight and therefore tends under vacuum at elevated temperatures to undergo volatilization from the composition to be crosslinked.

It is an object of the invention to offer a process for preparing a polyacrylate pressure-sensitive adhesive in which a crosslinkable saturated polyacrylate system is processed by the hotmelt process and can then be crosslinked. This system ought to be stable to the drastic conditions of the hotmelt process over a relatively long period of time; that is, it ought to have a correspondingly high pot life. Gelling of the polyacrylate system during the hotmelt process should be avoided, at least to a large extent. The aim here is to find a method of crosslinking which does not require the presence of additional components or groups which activate crosslinking. The operation of crosslinking should be unaffected, or not substantially affected, by the presence of additives in the pressure-sensitive adhesive.

This object is achieved, surprisingly and unforeseeable for the skilled worker, by a process as described in the main claim. The dependent claims relate to advantageous variants of this process. Also claimed is the use of a polyfunctional α-cleaver present in oligomeric form.

The main claim accordingly provides a process for preparing a polyacrylate pressure-sensitive adhesive by way of a hotmelt process in which a polyfunctional α-cleaver present in oligomeric form is added to the polymer to be crosslinked, prior to processing by the hotmelt process, and the UV crosslinking is carried out after processing by the hotmelt process.

Compounds termed α-cleavers are those which function as initiators and which during the initiation step, as a result for example of ultraviolet irradiation, undergo intermolecular cleavage and in doing so break down into free-radical fragments, with the bond to the heteroatom or carbon atom positioned α to a group which activates the formation of free radicals, in particular to a carbonyl group, being cleaved.

Great preference is given to the use as α-cleaving initiator of an α-hydroxy ketone for the purposes of the present invention.

In one particularly advantageous embodiment of the inventive process the α-hydroxy ketone used is oligo[2-hydroxy-2-methyl-1-[4-(1-methylvinyl)phenyl]propanone]:

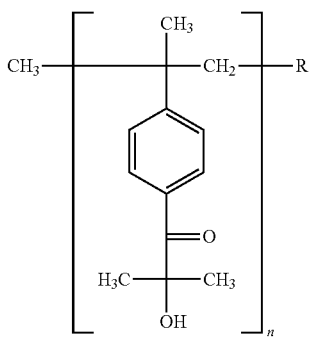

It is advantageous if the α-cleaver is used at from 0.1 to 5% by weight, in particular from 0.25 to 1% by weight, based in each case on the polymer to be crosslinked.

Critical to the inventive process is that the α-cleaver used as photoinitiator, in preferred form the α-hydroxy ketone, is not copolymerized into the prepolymer but is instead admixed as a separate component after the polymerization but before the crosslinking. In online operation this is synonymous with an addition before the hotmelt process, since crosslinking immediately follows this.

The UV initiators used are known in principle for this function for acrylate compositions. What was not to be expected was that these initiators would withstand the conditions of the hotmelt process over a relatively long time: thus, surprisingly, over a long period of time, neither decomposition nor other destruction was found, nor did these initiators undergo volatilization, as is observed generally no later than during the concentration process in the case of the UV initiators commonly used for the hotmelt process.

In order to increase the lifetime of the pressure-sensitive adhesives and their precursors, they should be stored and/or processed in the dark.

In another very advantageous embodiment of the inventive process the polymer to be crosslinked is prepared using any monomer mixture comprising at least the following components:
a) 65 to 100% by weight of (meth)acrylic acid and (meth)acrylic acid derivatives of the general formula

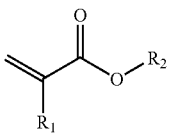

where $R_1$=H or $CH_3$ and $R_2$ is an alkyl chain having 2 to 20 carbon atoms,
b) 0 to 35% by weight of vinyl compounds containing functional groups, specifically such that the sum of all of the components used is 100% by weight.

Furthermore, it is a very great advantage if the polymer to be crosslinked has added to it 0.5 to 40% by weight of one or more resins and/or 0.1 to 0.3% by weight of one or more—especially oligomeric—amine acrylates, based in each case on the prepolymer.

In one procedure which is advantageous for the process the UV crosslinking is brought about by means of brief ultraviolet irradiation within a wavelength range from 200 to 400 nm, in particular using high-pressure or medium-pressure mercury lamps with an output of from 80 to 200 W/cm.

Also claimed is the use of a polyfunctional α-cleaver in oligomeric form, in particular an α-hydroxy ketone in said form, especially oligo[2-hydroxy-2-methyl-1-[4-(1-methylvinyl)phenyl]propanone], as UV initiator for the crosslinking of polyacrylate pressure-sensitive adhesives passing through the hotmelt process.

In addition to the polyacrylates set out above, crosslinking by the inventive process can be carried out using all acrylate pressure-sensitive adhesives, especially those which possess pressure-sensitive adhesion properties in accordance with the "Handbook of Pressure Sensitive Adhesive Technology" by Donatas Satas (van Nostrand, N.Y., 1989).

The polymer to be crosslinked is prepared preferably by way of a free or controlled radical polymerization. The polymerization can be carried out in polymerization reactors, which are generally provided with a stirrer, two or more feed vessels, reflux condenser, heating, and cooling, and are equipped for operating under $N_2$ atmosphere and superatmospheric pressure.

The free-radical polymerization is conducted in the presence of one or more organic solvents and/or in the presence of water or without solvent. The aim is to minimize the amount of solvent used. Depending on conversion and temperature, the polymerization time is between 6 and 48 hours. The average molecular weight of the polymers varies between 300,000 and 2,000,000 g/mol, preferably between 600,000 and 1,200,000 g/mol.

Solvents used for the solution polymerization are preferably esters of saturated carboxylic acids (such as ethyl acetate), aliphatic hydrocarbons (such as n-hexane or n-heptane), ketones (such as acetone or methyl ethyl ketone), special boiling point spirit or mixtures of these solvents. Great preference is given to using a solvent mixture of acetone and isopropanol in which the isopropanol content is between 1 and 10 percent by weight. Polymerization initiators used are customary free-radical-forming compounds, such as peroxides and azo compounds, for example. Initiator mixtures can also be used. During the polymerization it is also possible to employ thiols as further regulators for lowering the molecular weight and reducing the polydispersity. Further compounds which can be used, referred to as polymerization regulators, include, for example, alcohols and ethers.

Advantageously, tackifying resins can be added to the polymers, with a percentage fraction of up to 40% by weight. For this purpose, without exception, it is possible to use all existing and literature-described tackifier resins. As representatives, mention may be made of pinene resins, indene resins, and rosins, their disproportionated, hydrogenated, polymerized, esterified derivatives and salts, aliphatic and aromatic hydrocarbon resins, terpene resins and terpene-phenolic resins, and also $C_5$, $C_9$, and other hydrocarbon resins. Any desired combinations of these and further resins may be used in order to adjust the properties of the resultant adhesive in accordance with what is desired. Express reference may be made to the depiction of the state of knowledge in the "Handbook of Pressure Sensitive Adhesive Technology" by Donatas Satas (van Nostrand, N.Y., 1989).

The addition of amine acrylates is very advantageous, especially those present in oligomeric form, to the polymer to be crosslinked. The rate of crosslinking can be increased by this means. Products which have been found particularly appropriate are those offered in the trade name Genomer™ from the company Rahn: Genomer 5248™, Genomer 5275™, and Genomer 5292™. In connection with the addition of the amine acrylates it should be borne in mind that an increase in the rate of crosslinking is accompanied by a fall in stability under hotmelt conditions. Advantageously, therefore, these compounds are not added until a relatively short time before crosslinking.

One advantage through the addition of the accelerators arises as a result of an expanded selection of the acrylate comonomers, which are no longer subject to the restrictions which hitherto applied and which arose from the prior art. Thus, for example, it is also possible to copolymerize into the polymer acrylate monomers containing carboxylic acid; here too, efficient crosslinking is possible and allows high-shear-strength, strongly adhesive acrylate pressure-sensitive adhesives to be realized.

In order to increase the crosslinking efficiency, the uncrosslinked polymers are optionally blended with crosslinkers: suitable crosslinker substances for this purpose are, for example, difunctional or polyfunctional acrylates. However, it is also possible here to use all other difunctional or polyfunctional compounds which are familiar to the skilled worker and are capable of crosslinking polyacrylates.

The uncrosslinked polymers blended in this way are applied preferably as a hotmelt to a backing (PP, BOPP, PET, nonwoven, PVC, polyester, foam, etc.) or release paper (glassine, HDPE, LDPE), application taking place directly or by transfer lamination. UV crosslinking then takes place advantageously directly on this backing. Where the amine acrylates described above are added, this can be done, in an outstanding form, immediately prior to coating, in order to minimize the time for which these compounds are exposed under drastic reaction conditions.

The acrylate pressure-sensitive adhesives prepared by the inventive processes may additionally be blended with one or more additives such as (primary and secondary) aging inhibitors, light stabilizers, and ozone protectants.

In addition they may be filled with one or more fillers such as fibers, carbon black, zinc oxide, titanium dioxide, solid microbeads, silica, silicates, and chalk, the addition of blocking-free-isocyanates also being possible.

For documentation, the series of experiments set out below were performed.

EXAMPLES

Test Methods

The following test methods were employed to evaluate the technical adhesive properties of the pressure-sensitive adhesives prepared.
Shear Strength (Test A)

A strip of the adhesive tape 13 mm wide was applied to a smooth steel surface which had been cleaned three times with acetone and once with isopropanol. The area of application was 20 mm×13 mm (length×width). The adhesive tape was then pressed onto the steel support four times using a 2 kg weight. At room temperature, a 1 kg weight was fastened to the adhesive tape and the time taken for the weight to fall down was measured.

The shear stability times measured are reported in minutes and correspond to the average of three measurements.
Determination of the Gel Fraction (Test B)

The carefully dried solvent-free samples of adhesive are welded into a pouch of polyethylene web (Tyvek nonwoven). The gel index, i.e., the toluene-insoluble weight fraction of the polymer, is determined from the difference in the weights of the samples before and after extraction by toluene.
180° Bond Strength Test (Test C)

A strip 20 mm wide of an acrylate pressure-sensitive adhesive (PSA) was applied to steel plates washed twice with acetone and once with isopropanol. The PSA strip was pressed onto the substrate twice with a 2 kg weight. Immediately thereafter the adhesive tape was peeled from the substrate at a speed of 300 mm/min and at an angle of 180°. All measurements were conducted at room temperature under climatized conditions.

The results have been reported in N/cm and have been averaged from three measurements.
Production and Crosslinking of the Samples
Part I: Addition of Esacure KIP 150™
Preparation of the Reference Polyacrylate A 200 L reactor conventional for free-radical polymerizations was charged with 3.84 kg of acrylic acid, 8.32 kg of N-tert-butylacrylamide, 7.84 kg of methyl acrylate, 60 kg of 2-ethylhexyl acrylate and 60 kg of acetone/isopropanol (96:4). After nitrogen gas had been passed through the rector for 45 minutes with stirring the reactor was heated to 58° C. and 40 g of 2,2'-azoisobutyronitrile (AIBN) were added. The external heating bath was then heated to 75° C. and the reaction was carried out constantly at this external temperature. After a reaction time of 1 hour a further 40 g of AIBN were added. The reaction was terminated after a reaction time of 48 hours and the product was cooled to room temperature.
UV Irradiation UV irradiation was carried out using a UV unit from Eltosch. The unit is equipped with a medium-pressure Hg UV lamp having an intensity of 120 W/cm. The swatches were each passed through the unit at a speed of 20 m/min, the specimens being irradiated in a number of passes in order to increase the irradiation dose.

The recorded UV dose is reported in $J/cm^2$.

Example I/1

The pressure-sensitive adhesive was blended with 0.5% by weight of Esacure KIP 150™ (from Lamberti) and then concentrated in a single-screw extruder (from Berstorff). The speed of the screw was 160 rpm, and a throughput of 55 kg/h was realized. For concentration, a vacuum was applied at 3 different domes. The subatmospheric pressures were in each case 130 mbar, 75 mbar, and 60 mbar, the lowest vacuum being applied in the first dome. The exit temperature of the concentrated hotmelt was 130° C. For coating, the extrudates were melted in a slot die (from Pröls). After conditioning at 120° C. for 48 hours the melt was coated onto a Saran-primed PET film 23 µm thick. The application rate was 50 $g/m^2$. The adhesive tape specimen was then irradiated with the UV unit, the specific irradiated dose being listed in the table. To determine the efficiency of crosslinking, test method B was carried out in each case. To examine the technical adhesive properties, test methods A and C were employed.

Example I/1a

The pressure-sensitive adhesive was blended with 0.5% by weight of Speedcure ITX™ (from Rahn), after which the procedure was as in Example 1. The adhesive tape specimen was irradiated with the UV unit, the specific irradiated dose being listed in the table. For determining the efficiency of the crosslinking, test method B was carried out in each case.

Example I/1b

The pressure-sensitive adhesive was blended with 0.5% by weight of Irgacure 819™ (from Ciba-Geigy), after which the procedure was as in Example 1. The adhesive tape specimen was irradiated with the UV unit, the specific irradiated dose being listed in the table. For determining the efficiency of the crosslinking, test method B was carried out in each case.

Example I/1c

The pressure-sensitive adhesive was blended with 0.5% by weight of Irgacure 651™ (from Ciba-Geigy), after which the procedure was as in Example I/1. The adhesive tape specimen was irradiated with the UV unit, the specific irradiated dose being listed in the table. For determining the efficiency of the crosslinking, test method B was carried out in each case.

Example I/1d

The pressure-sensitive adhesive was blended with 0.5% by weight of Irgacure 184™ (from Ciba-Geigy), after which the procedure was as in Example I/1. The adhesive tape specimen was irradiated with the UV unit, the specific irradiated dose being listed in the table. For determining the efficiency of the crosslinking, test method B was carried out in each case.

Example I/1e

The pressure-sensitive adhesive was blended with 0.5% by weight of Irgacure 369™ (from Ciba-Geigy), after which the procedure was as in Example I/1. The adhesive tape specimen was irradiated with the UV unit, the specific irradiated dose being listed in the table. For determining the efficiency of the crosslinking, test method B was carried out in each case.

Example I/1f

The pressure-sensitive adhesive was blended with 0.5% by weight of Speedcure BMDS™ (from Rahn), after which the procedure was as in Example I/1. The adhesive tape specimen was irradiated with the UV unit, the specific irradiated dose being listed in the table. For determining the efficiency of the crosslinking, test method B was carried out in each case.

Example I/2

A 200 L reactor conventional for free-radical polymerizations was charged with 4.8 kg of acrylic acid, 3.2 kg of N-tert-butylacrylamide, 9.6 kg of methyl acrylate, 62.4 kg of 2-ethylhexyl acrylate and 60 kg of acetone/isopropanol (96:4). After nitrogen gas had been passed through the reactor for 45 minutes with stirring the reactor was heated to 58° C. and 40 g of 2,2'-azoisobutyronitrile (AIBN) were added. The external heating bath was then heated to 75° C. and the reaction was carried out constantly at this external temperature. After a reaction time of 1 hour a further 40 g of AIBN were added. The reaction was terminated after a reaction time of 48 hours and the product was cooled to room temperature.

The pressure-sensitive adhesive was blended with 0.5% by weight of Esacure KIP 150™ (from Lamberti) and then concentrated in a single-screw extruder (from Berstorff). The speed of the screw was 160 rpm, and a throughput of 60 kg/h was realized. For concentration, a vacuum was applied at 3 different domes. The subatmospheric pressures were in each case 160 mbar, 100 mbar, and 65 mbar, the lowest vacuum being applied in the first dome. The exit temperature of the concentrated hotmelt was 130° C. For coating, the extrudates were melted in a slot die (from Pröls). After conditioning at 120° C. for 48 hours the melt was coated onto a Saran-primed PET film 23 μm thick. The application rate was 50 g/m². The adhesive tape specimen was then irradiated with the UV unit, the specific irradiated dose being listed in the table. To determine the efficiency of crosslinking, test method B was carried out in each case. To examine the technical adhesive properties, test methods A and C were employed.

Example I/3

The procedure of Example I/2 was repeated. The polymerization was carried out using 4.8 kg of acrylic acid, 6.4 kg of N-tert-butylacrylamide, 12 kg of methyl acrylate, 62.4 kg of 2-ethylhexyl acrylate and 60 kg of acetone/isopropanol (96:4).

Example I/4

The procedure of Example I/2 was repeated. The polymerization was carried out using 1.2 kg of acrylic acid, 6.4 kg of N-tert-butylacrylamide, 0.8 kg of maleic anhydride, 35.8 kg of n-butyl acrylate, 35.8 kg of 2-ethylhexyl acrylate and 60 kg of acetone/isopropanol (96:4).

Example I/5

The procedure of Example I/2 was repeated. The polymerization was carried out using 0.4 kg of acrylic acid, 6.4 kg of N-tert-butylacrylamide, 0.8 kg of maleic anhydride, 72.4 kg of 2-ethylhexyl acrylate and 60 kg of acetone/isopropanol (96:4).

Example I/6

The procedure of Example I/2 was repeated. The polymerization was carried out using 8 kg of acrylic acid, 72 kg of 2-ethylhexyl acrylate and 60 kg of acetone/isopropanol (96:4).

Part II: Addition of Esacure KIP 150™ and Genomer™
Preparation of the Polyacrylate A 200 L reactor conventional for free-radical polymerizations was charged with 0.8 kg of acrylic acid, 6.4 kg of N-tert-butylacrylamide, 0.8 kg of maleic anhydride, 36 kg of 2-ethylhexyl acrylate, 36 kg of n-butyl acrylate and 60 kg of acetone/isopropanol (97:3). After nitrogen gas had been passed through the reactor for 45 minutes with stirring the reactor was heated to 58° C. and 40 g of 2,2'-azoisobutyronitrile (AIBN) were added. The external heating bath was then heated to 75° C. and the reaction was carried out constantly at this external temperature. After a reaction time of 1 hour a further 40 g of AIBN were added. The reaction was terminated after a reaction time of 48 hours, the product was cooled to room temperature, and finally 0.8 kg of Genomer 4212™ (from Rahn) was added.

UV Irradiation

UV irradiation was carried out using a UV unit from Eltosch. The unit is equipped with a medium-pressure Hg UV lamp having an intensity of 120 W/cm. The swatches were each passed through the unit at a speed of 20 m/min, the specimens being irradiated in a number of passes in order to increase the irradiation dose.

Example II/1

The pressure-sensitive adhesive was blended with 30 weight fractions of resin DT 110™ (from DRT) and 0.5 weight fractions of Esacure KIP 150™ (from Lamberti) and then concentrated in a single-screw extruder from Berstorff. The speed of the screw was 160 rpm, and so a throughput of 60 kg/h was realized. For concentration, a vacuum was applied at 3 different domes. The subatmospheric pressures were in each case 160 mbar, 70 mbar, and 55 mbar, the lowest vacuum being applied in the first dome. The exit temperature of the concentrated hotmelt was 110° C. Thereafter, using a counterrotatingly operated twin-screw extruder from Welding, 0.3 weight fractions of Genomer 5248™ (from Rahn), based on the polymer, were compounded in at a speed of 320 rpm. For coating, the extrudates were melted in a slot die from Pröls, coating taking place onto a Saran-primed PET film 23 µm thick. The application rate was 100 g/m². The adhesive tape specimen was then irradiated with 2 and 4 passes through the UV unit. To determine the technical adhesive data, test methods A and B were conducted.

Example II/1a

The pressure-sensitive adhesive was blended with 30 weight fractions of resin DT 110™ (from DRT), 0.5 weight fractions of Esacure KIP 150™ (from Lamberti) and 1.0 weight fractions of Genomer 5248™ (from Rahn). The procedure of Example II/1 was then followed. The mixture gelled in the hotmelt processing operation and could not be used any further.

Example II/1b

The pressure-sensitive adhesive was blended with 30 weight fractions of resin DT 110™ (from DRT), 0.5 weight fractions of Esacure KIP 150™ (from Lamberti) and the procedure of Example II/1 was then followed.

Example II/1c

The pressure-sensitive adhesive was blended with 30 weight fractions of resin DT 110™ (from DRT), 0.5 weight fractions of Esacure KIP 150™ (from Lamberti) and 0.5 weight fractions of Genomer 5248™ (from Rahn). The mixture gelled in the hotmelt processing operation and could not be used any further.

Example II/2 (Reference)

The pressure-sensitive adhesive was blended with 30 weight fractions of resin DT 110™ (from DRT) and 0.5 weight fractions of Speedcure ITX™ (from Rahn) and then concentrated in a single-screw extruder from Berstorff. The speed of the screw was 160 rpm, and so a throughput of 60 kg/h was realized. For concentration, a vacuum was applied at 3 different domes. The subatmospheric pressures were in each case 160 mbar, 70 mbar, and 55 mbar, the lowest vacuum being applied in the first dome. The exit temperature of the concentrated hotmelt was about 113° C. For coating, the extrudates were melted in a slot die from Pröls. After conditioning at 140° C. for 1 hour, coating took place onto a Saran-primed PET film 23 µm thick. The application rate was 100 g/m². The adhesive tape specimen was then irradiated with 2 and 4 passes through the UV unit. To determine the technical adhesive data, test methods A and B were conducted.

Example II/3 (Reference)

The pressure-sensitive adhesive was blended with 30 weight fractions of resin DT 110™ (from DRT), 0.5 weight fractions of Speedcure ITX™ (from Rahn) and 0.3 weight fractions of Genomer 5248™ (from Rahn). The procedure of Example II/1 was followed.

Example II/4 (Reference)

The pressure-sensitive adhesive was blended with 30 weight fractions of Resin DT 110™ (from DRT) and 0.5 weight fractions of Irgacure 819™ (from Ciba-Geigy) and the procedure of Example II/2 was then followed.

Example II/5 (Reference)

The pressure-sensitive adhesive was blended with 30 weight fractions of resin DT 110™ (from DRT), 0.5 weight fractions of Irgacure 819™ (from Ciba-Geigy) and 0.3 weight fractions of Genomer 5248™ (from Rahn) and the procedure of Example II/3 was then followed.

Example II/6

The pressure-sensitive adhesive was blended with 0.5 weight fractions of Esacure KIP 150™ (from Lamberti) and 0.3 weight fractions of Genomer 5248™ (from Rahn) and the procedure of Example II/3 was then followed.

Example II/7 (Reference)

The pressure-sensitive adhesive was blended with 0.5 weight fractions of Speedcure ITX™ (from Rahn) and 0.3 weight fractions of Genomer 5248™ (from Rahn) and the procedure of Example II/3 was then followed.

Example II/8

The pressure-sensitive adhesive was blended with 25 weight fractions of Piccotex 75™, 0.5 weight fractions of Esacure KIP 150™ (from Lamberti) and 0.3 weight fractions of Genomer 5248™ (from Rahn) and the procedure of Example II/3 was then followed.

Example II/9

The pressure-sensitive adhesive was blended with 25 weight fractions of Piccotex 75™ (from Hercules), 0.5 weight fractions of Esacure KIP 150™ (from Lamberti) and 0.3 weight fractions of Genomer 5275™ (from Rahn) and the procedure of Example II/3 was then followed.

Example II/10

The pressure-sensitive adhesive was blended with 25 weight fractions of Piccotex 75™ (from Hercules), 0.5 weight fractions of Esacure KIP 150™ (from Lamberti) and 0.3 weight fractions of Genomer 5292™ (from Rahn) and the procedure of Example II/3 was then followed.

Results

To demonstrate the efficiency of Esacure KIP 150™ (from Lamberti) various alternative UV photoinitiators were tested in comparison. Irgacure 819™, 651™, and 184™ (from Ciba-Geigy) are standard systems for the UV crosslinking of polyacrylates. Speedcure ITX™ (from Rahn) is considered an extremely reactive photoinitiator and was therefore also tested in comparison. The results of these investigations are summarized in Table 1.

TABLE 1

| Example | UV irradiation; number of passes | Gel index [%] |
|---|---|---|
| I/1 | 0 | 0 |
| I/1 | 1 | 35 |
| I/1 | 2 | 74 |
| I/1a | 0 | 0 |
| I/1a | 1 | 9 |
| I/1a | 2 | 26 |
| I/1b | 0 | 0 |
| I/1b | 1 | 3 |
| I/1b | 2 | 5 |
| I/1c | 0 | 0 |
| I/1c | 1 | 5 |
| I/1c | 2 | 12 |
| I/1d | 0 | 0 |
| I/1d | 1 | 9 |
| I/1d | 2 | 16 |
| I/1e | 0 | 0 |
| I/1e | 1 | 1 |
| I/1e | 2 | 3 |
| I/1f | 0 | 0 |
| I/1f | 1 | 14 |
| I/1f | 2 | 30 |

The photoinitiator Esacure KIP 150™ (from Lamberti) (Example I/1) clearly gave the best results. Even at very low doses, very high gel indices were achieved, so that this photoinitiator is very highly suitable for crosslinking pure polyacrylate PSAs. In comparison to the other photoinitiators, therefore, a much lower technical irradiation expense (number of UV lamps) is needed, so making the operation much more advantageous economically.

Table 1 also indicates that certain photoinitiators possess virtually no effect with the crosslinking of the polyacrylates and that the difference in terms of the gel indices which can be achieved after crosslinking, between crosslinking processes initiated with Esacure KIP 150™ and the other systems, is very great. The increase in efficiency is therefore significant.

It is also known that the low volatility of photoinitiators poses a problem for the hotmelt process. When the oligomeric KIP 150 is used this volatility is reduced significantly owing to the high molecular weight; this is a further advantage of the inventive process for hotmelt processability.

To demonstrate the general applicability to acrylate hotmelt compositions, a number of polyacrylates were prepared, blended with Esacure KIP 150™ and then examined in view of the technical adhesive properties particularly for subsequent use as PSA tape.

The results of the technical adhesive tests for the UV-crosslinked polyacrylates are shown in Table 2.

| Example | UV irradiation; number of passes | SST RT, 10 N [min] | BS-steel, [N/cm] | Gel index [%] |
|---|---|---|---|---|
| I/1 | 2 | +10000 | 5.1 | 74 |
| I/2 | 2 | +10000 | 4.8 | 75 |
| I/3 | 2 | +10000 | 4.6 | 76 |
| I/4 | 2 | 6780 | 5.2 | 74 |
| I/5 | 2 | 2450 | 5.6 | 72 |
| I/6 | 2 | +10000 | 4.7 | 68 |

SST: Shear stability time
RT: Room temperature
BS: Bond strength

The results in Table 2 demonstrate that various pure and saturated polyacrylate PSAs without further additions can be crosslinked efficiently using Esacure KIP 150™ For polar acrylate PSAs a very good cohesion is achieved. The gel indices are about 70% with 2 passes of UV irradiation. In conjunction with the good thermal stability and the low volatility as result of the high average molecular weight, a distinct advantage is produced as compared with conventional photoinitiators.

In order to demonstrate the efficiency of the combination of Esacure KIP 150™ (from Lamberti) and the polyamine Genomer 5248™ (from Rahn), a variety of alternative UV photoinitiators were tested in comparison. Irgacure 819™ (from Ciba-Geigy) is the standard system for the UV crosslinking of polyacrylates. Speedcure ITX™ (from Rahn) is considered an extremely reactive photoinitiator and was therefore likewise tested in comparison. The references were investigated in each case with and without accelerator Genomer 5248™ (from Rahn). The result of these investigations are summarized in Table 1.

TABLE 1

| Example | Number of passes for UV irradiation | Gel index [%] | SST RT, 10 N [min] |
|---|---|---|---|
| II/1 | 0 | 0 | 19 |
| II/1 | 2 | 10 | +10000 |
| II/1 | 4 | 14 | +10000 |
| II/1b | 0 | 0 | 0 |
| II/1b | 2 | 2 | 342 |
| II/1b | 4 | 6 | 485 |
| II/2 | 0 | 0 | 34 |
| II/2 | 2 | 0 | 175 |
| II/2 | 4 | 2 | 264 |
| II/3 | 0 | 0 | 15 |
| II/3 | 2 | 4 | 1478 |
| II/3 | 4 | 12 | 7640 |
| II/4 | 0 | 0 | 28 |
| II/4 | 2 | 0 | 134 |
| II/4 | 4 | 0 | 235 |
| II/5 | 0 | 0 | 18 |
| II/5 | 2 | 0 | 127 |
| II/5 | 4 | 1 | 376 |

SST: Shear stability time
RT: Room temperature

The best results were achieved with the inventive combination of Esacure KIP 150™ (from Lamberti) and 0.3 weight fractions of Genomer 5248™ (from Rahn) as the initiator system. After just 2 UV passes a gel index of 10% was achieved, which gives the system a high shear strength. Nevertheless, the blend with excessive fractions of amine accelerator showed that gelling then occurs by way of the carboxylic acid groups, so that the synergistic effects of photoinitiator and amine accelerator can be utilized only with a Genomer 5248™ weight fraction of <0.5 and >0.

The other two photoinitiator systems (Irgacure 819™ and Speedcure ITX™) are significantly less reactive and require a far higher UV radiation dose. Furthermore, the addition of accelerator substance is essential, since under standard conditions virtually no crosslinking otherwise occurs.

The results of the technical adhesive tests for the pure polyacrylates (Examples II/6 and II/7) are shown in Table 2.

TABLE 2

| Example | Number of passes for UV irradiation | Gel index [%] | SST RT, 10 N [min] |
|---|---|---|---|
| II/6 | 0 | 29 | 1588 |
| II/6 | 2 | 76 | 505 |
| II/6 | 4 | 79 | 448 |
| II/7 | 0 | 29 | 1256 |
| II/7 | 2 | 67 | 908 |
| II/7 | 4 | 76 | 292 |

SST: Shear stability time
RT: Room temperature

The results in Table 2 demonstrate that pure polyarylate systems can also be crosslinked efficiently with the inventive photoinitiator/accelerator combination. The comparison of Esacure KIP 150™ with Speedcure ITX™ also shows a greater efficiency for KIP 150™ for the pure polyacrylates. Particularly at a relatively low radiation dose, Esacure KIP 150™ is more reactive than Speedcure ITX™, and this is manifested in a gel index which increases more rapidly. As far as the shear strength is concerned, the pure polyacrylate systems become overcrosslinked with even relatively low irradiation, so that the specimens irradiated in Table 2 all fail adhesively, and, therefore, the values measured are relatively low.

The results of the technical adhesive tests for Examples II/8 to II/10) are shown in Table 3.

TABLE 3

| Example | Number of passes for UV irradiation | Gel index [%] | SSZ RT, 10 N [min] |
|---|---|---|---|
| II/8 | 0 | 0 | 122 |
| II/8 | 2 | 11 | 2354 |
| II/8 | 4 | 18 | 6759 |
| II/9 | 0 | 0 | 134 |
| II/9 | 2 | 12 | 2183 |
| II/9 | 4 | 20 | 7140 |
| II/10 | 0 | 0 | 98 |
| II/10 | 2 | 13 | 2542 |
| II/10 | 4 | 22 | 8025 |

SST: Shear stability time
RT: Room temperature

Examples II/8 to II/10 demonstrate that further resin-blended polyacrylate hotmelt PSAs can also be crosslinked efficiently with the inventive combination of accelerator and photoinitiator Esacure KIP 150™ without this process being severely adversely affected by the regulating activity of the resins during crosslinking. In all cases, UV irradiation produces a sharp rise in the cohesion of the pressure-sensitive adhesive, and with 4 passes the values obtained lie within the range for optimum crosslinking. Moreover, Examples II/8 to II/10 demonstrate that different accelerators can also be used.

In summary it can be stated that the inventive process unexpectedly makes available an extremely stable crosslinkable acrylate hotmelt system which has a very high pot life. For saturated systems, therefore, an efficient crosslinking method is available, even in the presence of additives, resins, and the like. In contrast to systems prepared by polymer-analogous reactions, there is essentially no gelling reaction.

Through the addition of (oligomeric) amine acrylates shortly before coating it is possible to improve the crosslinking further.

The invention claimed is:

1. A process for preparing a polyacrylate pressure-sensitive adhesive, said process comprising the following steps:
 a) forming a saturated polyacrylate polymer by polymerization;
 b) combining the saturated polyacrylate polymer formed in a) with a polyfunctional α-cleaving α-hydroxy ketone initiator present in oligomeric form to form a polymer/initiator combination;
 c) processing the polymer/initiator combination formed in b) by a hot-melt process to form a hot-melt processed polymer/initiator combination;
 d) adding at least one amine acrylate to the hot-melt processed polymer/initiator combination formed in c); and
 e) crosslinking the saturated polyacrylate polymer by exposing the hot-melt processed polymer/initiator combination formed in d) to ultraviolet radiation.

2. The process of claim 1, wherein the amount of α-cleaving α-hydroxy ketone initiator added is from 0.25 to 1% by weight, based on the weight of said polymer to be crosslinked.

3. The process of claim 1, wherein the saturated polyacrylate polymer to be crosslinked is prepared by polymerization of a monomer mixture comprising at least the following components:
 a) 65 to 100% by weight of (meth)acrylic acid and (meth)acrylic acid derivatives of the formula

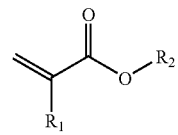

where $R_1$=H or $CH_3$ and $R_2$ is an alkyl chain having 2 to 20 carbon atoms,
 b) 0 to 35% by weight of vinyl compounds containing functional groups,
 so that the sum of all of the components used is 100% by weight.

4. The process of claim 1, wherein 0.5 to 40% by weight of one or more resins is added to the polyacrylate polymer to be crosslinked.

5. The process of claim 1, wherein ultraviolet crosslinking is brought about by means of ultraviolet irradiation within a wavelength range from 200 to 400 nm.

6. The process of claim 1, wherein the α-cleaving α-hydroxy ketone initiator used is oligo[2-hydroxy-2-methyl-1-[4-(1-methylvinyl)phenyl]propanone].

7. The process of claim 1, wherein the at least one amine acrylate comprises oligomeric amine acrylates.

8. The process of claim 1, wherein the product of the hotmelt process is applied to a backing or release paper prior to ultraviolet crosslinking.

9. The process of claim 8, wherein the backing is nonwoven or a foam and/or is comprised of polypropylene, biaxially oriented polypropylene (BOPP), polyethylene terephthalate (PET), polyvinylchloride (PVC) or polyester.

10. The process of claim 8, wherein the release paper is glassine and/or is comprised of high density polyethylene or low density polyethylene.

11. The process of claim 8, wherein the product of the hotmelt process is applied directly to a backing or release paper prior to ultraviolet crosslinking.

12. The process of claim 8, wherein the product of the hotmelt process is applied by transfer lamination to a backing or release paper prior to ultraviolet crosslinking.

13. The process of claim 1, wherein the ultraviolet crosslinking is brought about by one or more high-pressure or medium pressure mercury lamps with an output of from 80 to 200 W/cm.

14. The process of claim 1, wherein the amount of amine acrylate added is from 0.1 to 0.3 by weight, based on the weight of said polymer to be crosslinked.

15. A process of crosslinking a hot-melt processed saturated polyacrylate pressure-sensitive adhesive, said process comprising the following steps:
 a) adding a polyfunctional α-cleaving α-hydroxy ketone initiator present in oligomeric form to a saturated polyacrylate pressure-sensitive adhesive to form a polymer/initiator combination;

b) processing the polymer/initiator combination formed in a) by a hot-melt process to form a hot-melt processed polymer/initiator combination;

c) adding at least one amine acrylate to the hot-melt processed polymer/initiator combination formed in b)

d) crosslinking the saturated polyacrylate polymer by exposing the hot-melt processed polymer/initiator combination formed in c) to ultraviolet radiation.

16. The process of claim 15, wherein the α-hydroxy ketone is oligo[2-hydroxy-2-methyl-1-[4-(1-methylvinyl)-phenyl] propanone].

17. The process of claim 15, wherein the saturated polyacrylate pressure-sensitive adhesive comprises one or more fillers selected from the group consisting of fibers, carbon black, zinc oxide, titanium dioxide, solid microbeads, silica, silicates, chalk and blocking-free isocyanates.

18. A polyacrylate pressure-sensitive adhesive produced by the process of any one of claims 2-5, 6, 7, 16-12, 1 or 15.

* * * * *